Jan. 27, 1970          W. D. ALLISON          3,491,845
MOTOR VEHICLE REAR SUSPENSION SYSTEM PROVIDING
EQUAL TRACTION DURING FORWARD ACCELERATION
Filed Dec. 14, 1967          3 Sheets-Sheet 1

INVENTOR.
WILLIAM D. ALLISON
BY John R. Faulkner
Clifford L. Sadler
ATTORNEYS

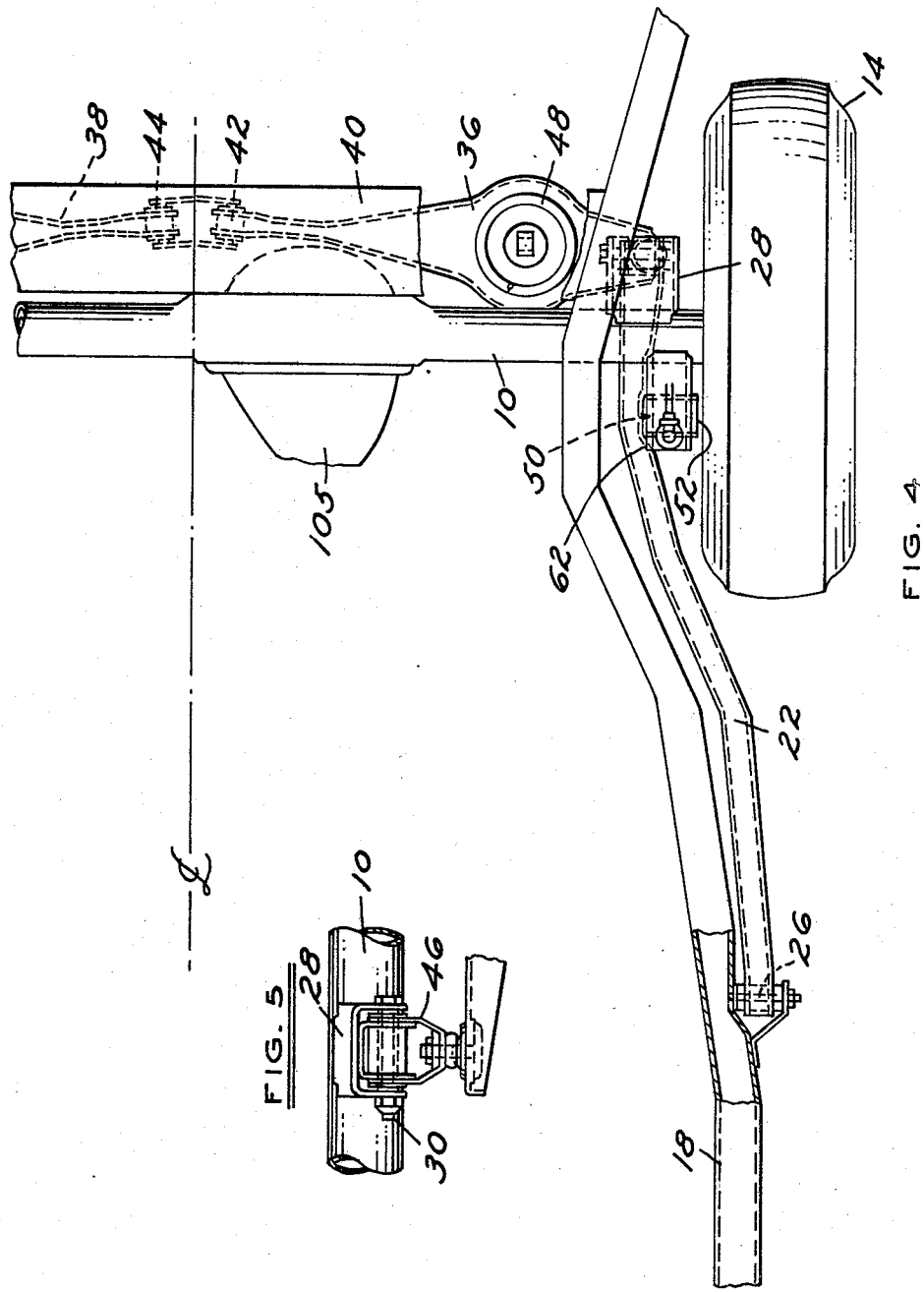

ically connected. Is the upper chamber has under-
equal areas of fluid under pressure due to the difference
in the diameter of the two piston rods. The right side
cylinder, having the smaller rod, has a greater fluid area
and thus exerts a force on the right side suspension arm
that is greater than the force exerted by the left side
cylinder. The difference in forces applied to the suspen-
sion arms by the cylinders results in a corresponding dif-
ference in vertical reaction forces to the body at the front
ends of the suspension arms. The right side arm lifts more
than the left side arm and results in a counterclockwise
moment (when viewed from the rear) to the body which
can be designed to be exactly equal and opposite to the
clockwise torque transmitted to the body through the
engine mounts. This equalizes the loading on the tires
and has the end result of providing equal traction during
forward acceleration.

United States Patent Office 3,491,845
Patented Jan. 27, 1970

3,491,845
MOTOR VEHICLE REAR SUSPENSION SYSTEM
PROVIDING EQUAL TRACTION DURING
FORWARD ACCELERATION
William D. Allison, Grosse Point Farms, Mich., assignor
to Ford Motor Company, Dearborn, Mich., a corpora-
tion of Delaware
Filed Dec. 14, 1967, Ser. No. 690,594
Int. Cl. B60k 23/00; B60g 11/26, 11/00
U.S. Cl. 180—71                                10 Claims

ABSTRACT OF THE DISCLOSURE

A motor vehicle suspension system having a solid rear
axle housing with a pair of suspension arms pivotally
connected to the vehicle chassis and to the axle. A double
acting hydraulic cylinder is interposed between each trail-
ing arm and an axle bracket. Each of the cylinders has
an annular hydraulic chamber situated above its piston
and a second chamber situated below the piston. The two
annular upper chambers are of unequal size because the
piston rod for the cylinder on the left side of the vehicle
is of larger diameter than the piston rod of the right
hydraulic cylinder. The two lower chambers are inter-
connected and the two upper chambers are interconnected.
With this structure, equal wheel traction is provided in
both forward acceleration and forward braking. The dis-
similar piston rod sizes produces unequal forces that off-
set engine torque during acceleration.

BACKGROUND OF THE INVENTION

In a conventional automobile, rotation of the engine
crankshaft and related components produces a torque
reaction that is transmitted to the body through the engine
mounts. The body tends to rotate in a clockwise direc-
tion (when viewed fom the rear) in accordance with the
counterclockwise rotation (viewed from the rear) of the
crankshaft. This increases the loading on the left rear
wheel which, in turn, produces an equal decrease in load-
ing on the right rear wheel. The end result is a reduction
in traction at the right rear wheel and possible spinning
of the wheel during acceleration.

In view of the foregoing problem, it is the principal
object of this invention to provide a rear suspension system
for a motor vehicle that counteracts the engine torque so
as to provide equal traction between the rear driving
wheels.

BRIEF SUMMARY OF THE INVENTION

In the presently preferred embodiment, a rear suspen-
sion system for a motor vehicle has a pair of trailing sus-
pension arms that are pivotally connected to the vehicle
body and to a rigid axle housing. A double acting hydrau-
lic cylinder is interposed between each arm and the axle
housing. The cylinders have pressure chambers situated
above and below the reciprocable piston in the cylinders.
The two lower chambers are interconnected by a hydraulic
line and the two upper chambers are interconnected by a
separate hydraulic line. The upper chamber for the right
suspension arm has a greater cross sectional area than
the left upper chamber due to the fact that its piston
rod is substantially smaller in diameter than the piston
rod for the left hydraulic cylinder. The hydraulic line
interconnecting the two upper pressure chambers is ex-
pansible to accommodate fluid displacement resulting from
the difference in piston rod diameters.

When driving torque is applied to the axle, the torque is
transmitted to the suspension arms through their pivotal
connection with the axle and the hydraulic cylinders. In
forward acceleration, the hydraulic fluid in the upper

BRIEF DESCRIPTION OF THE DRAWINGS

The many objects and advantages of the present inven-
tion will become apparent upon consideration of the fol-
lowing description and the accompanying drawings, in
which:

FIGURE 4 is a top plan view of the suspension system
shown in FIGURE 1 and 3; and FIGURE 5 is an enlarged view showing the pivotal
connection between a lateral arm of the suspension system
and the axle housing.

DETAILED DESCRIPTION OF THE INVENTION

Figure 1:
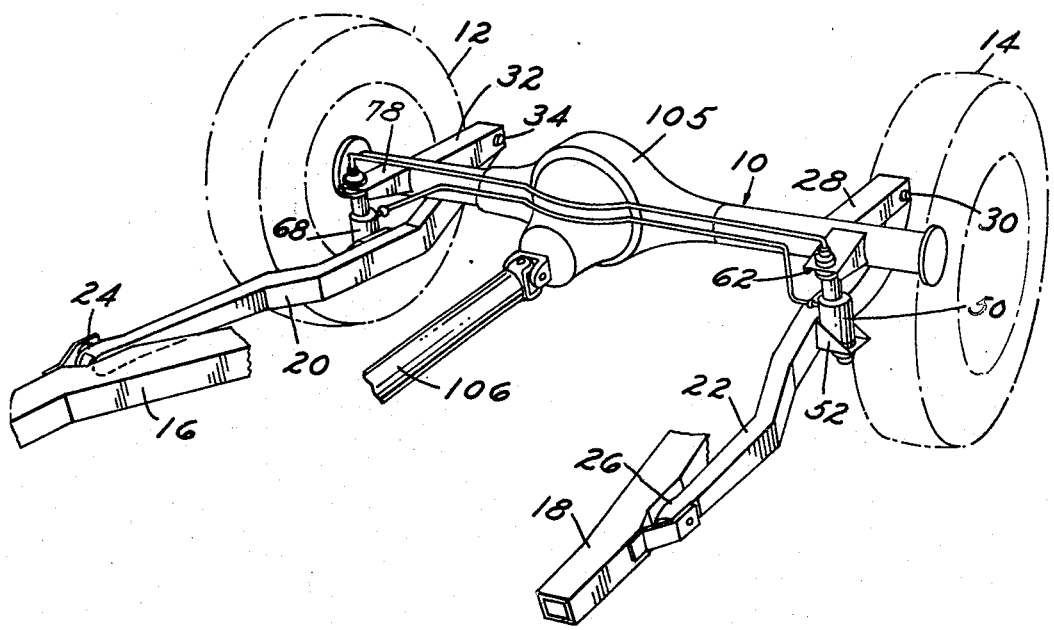
FIGURE 1 is a perspective view of a portion of a rear
suspension system for a motor vehicle incorporating the
present invention.

Referring now to the drawings, wherein the presently
preferred embodiment of this invention is illustrated,
FIGURE 1 discloses a rear suspension system for a motor
vehicle having an axle housing 10 to which driving wheels
12 and 14 are rotatably connected at its outer ends. The
axle housing 10 is connected to frame side rails 16 and 18
by means of trailing suspension arms 20 and 22. The
suspension arms 20 on the right side of the vehicle is con-
nected to the right frame rail 16 by means of a pivot 24.
Similarly, the left arm 22 is pivotally connected at 26 to
the left frame rail 14.

The suspension arms 16 and 18 may also be referred
to as torque arms due to the nature of the connection
between arms 20, 22 and the axle housing 10. A connec-
tion is provided which permits torque reaction to be
transmitted from the axle housing 10 through the arms
20, 22 to the frame members 16, 18.

Figure 3:
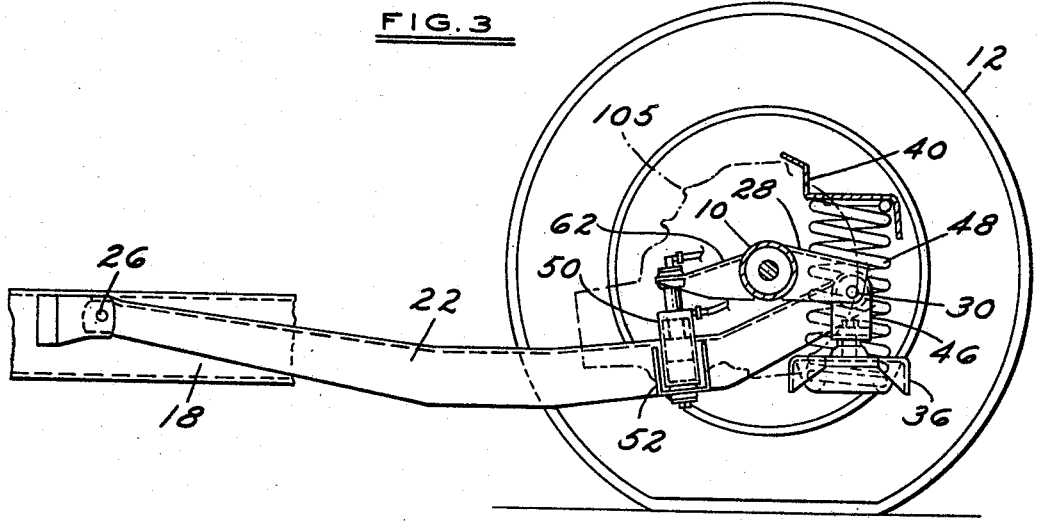
FIGURE 3 is a side elevational view, partly in section,
of the suspension system of FIGURE 1.

A bracket 28 is rigidly welded to the axle housing 10
and extends rearwardly therefrom. The bracket 28 pro-
vides support for a pivot pin 30 that is connected to the
rear end of the left suspension arm 22. As seen in
FIGURE 3, the arm 22 has a generally bowed shape and
extends from its forward pivot 26 rearwardly beneath the
axle housing 10 to its connection at 30 with the rear of the
bracket 28. The right suspension arm 20 has a similar con-
nection to the axle housing 10. A bracket 32 extends rear-
wardly from the housing 10 and has a pivotal connection
at 34 with the rear extremity of the right arm 20. The
right arm 20 is also bowed and extends beneath the axle
housing 10.

Means are provided to control the lateral position of
the axle housing 10 with respect to the vehicle frame.
Referring to FIGURE 4, a pair of laterally extending
suspension arms 36 and 38 have their inner ends pivotally connected to a frame cross member 40 by resilient bushings 42 and 44. The outer end of the left lateral arm 36 is connected to the axle housing bracket 28 by means of a swivel 46 which is shown in greater detail in FIGURE 5. The right lateral arm 38 has its outer end connected to the axle housing bracket 32 by means of a swivel construction such as illustrated in FIGURE 5.

A coil spring 48 has its upper end seated against the frame cross member 40 and its lower end positioned in a spring pocket formed in the left lateral arm 36. A second coil spring (not shown) is located between the frame member 40 and the lateral suspension arm 38 for the right side of the vehicle. These two coil springs resiliently support the body and chassis of the vehicle upon the axle housing 10 and the road wheels 12 and 14. A pair of conventional telescopic shock absorbers may be interposed between the axle housing 10 and the frame to damp jounce and rebound movement of the wheels 12 and 14. In order to avoid undue complication of the drawings, these shock absorbers are not illustrated.

Figure 2:
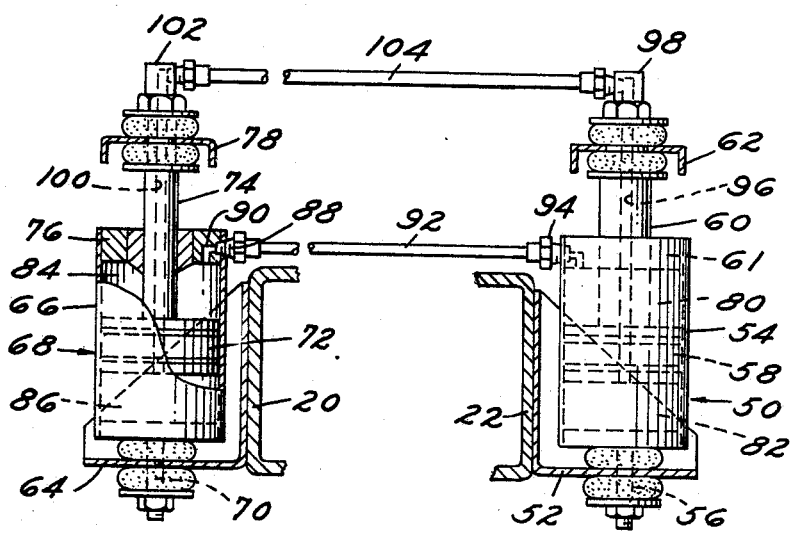
FIGURE 2 is a front elevation view, partly in sec-
tion, of the hydraulic portion of the suspension system
of FIGURE 1.

In accordance with the present invention, means are provided to control the transmission of torque from the axle housing 10 to the suspension arms 20 and 22. A double acting hydraulic cylinder 50 has its lower end secured to a bracket 52 that is welded to the left-hand suspension arm 22. As seen in FIGURE 2, the hydraulic cylinder 50 includes a cylindrical body portion 54 that has its lower end connected to the bracket 52 by means of a threaded fastener and rubber elements as indicated generally in 56. A piston 58 is reciprocably mounted within cylinder 54 and has a piston rod 60 extending through a closure member 61 at its upper end. The piston rod 60 is connected to a bracket 62 that is welded to the axle housing 10.

In a similar fashion, the right suspension arm 20 has a bracket 64 secured to it which provides a support for the body portion 66 of a double acting hydraulic cylinder 68. A threaded securing device 70 that includes a pair of resilient elements connects the body 66 to the bracket 64. A piston 72 is constructed to reciprocate within the cylindrical body 66 and has a piston rod 74 extending upwardly therefrom through a closure member 76. The rod 74 is connected to a bracket 78 that is welded to the right-hand end of the axle housing 10.

The piston 58 of the hydraulic cylinder 50 divides the interior of the body portion 54 into upper and lower pressure chambers 80 and 82. In a similar manner, piston 72 divides cylinder body 66 into an upper pressure chamber 84 and a lower pressure chamber 86. The cylinder bodies 54 and 66 have identical diameters and, therefore, the cross sectional area of the pressure chambers 82 and 86 are also identical.

The two upper pressure chambers 80 and 84 have an annular configuration due to the presence of the piston rods 60 and 74. As disclosed by FIGURE 2, the piston rod 60 has a greater diameter than the piston rod 74 and, therefore, the cross sectional area of the pressure chamber 84 is greater than the cross sectional area of the annular pressure chamber 80.

Means are provided to separately interconnect the two upper pressure chambers and the two lower pressure chambers. A hydraulic fitting 88 is in communication with a passage 90 in the closure member 76 which, in turn, is open to the annular upper chamber 84 of the right hydraulic cylinder 68. The fitting 88 is connected to a flexible hose 92 that extends to a fitting 94 in the closure member 61 of the cylinder 50. The fitting 94 is in communication with the annular upper pressure chamber 80 of the left cylinder 68. With this structure, fluid can flow freely from chamber 84 to chamber 80 and vice versa.

The two lower chambers 82 and 86 are interconnected as shown in FIGURE 2. The piston rod 60 of the left cylinder 50 has a central bore 96 that opens into the chamber 82 at its lower end and connects with a fitting 98 at its upper end. The piston rod 74 of the right hydraulic cylinder 68 has a central bore 100 that connects the lower chamber 86 with a hose fitting 102 at the upper end of the rod. A hose 104 joins the fitting 98 and 102 so that fluid may flow freely between the chambers 82 to 84. One or more of the hydraulic hoses 92 and 104 may be expansible under pressure. It is particularly desirable to have an expansible hose to accommodate the differences in fluid displacement resulting from the differences in diameters of the piston rods 60 and 74.

The axle housing 10 contains differential gearing within a differential housing portion 105. The propeller shaft 106 is connected to the vehicle power plant at its forward end and to gearing within the housing 105 at its rearward end. The differential gearing distributes torque through the axle shafts contained within the axle 10 to the wheels 12 and 14.

OPERATION

When driving or braking torque is applied to the axle 10, the torque is transmitted to the suspension or torque arms 20 and 22 through the hydraulic cylinders 68 and 50 situated ahead of the axle and the pivots 30 and 34 situated behind the axle. Braking in a forward direction compresses the hydraulic fluid in the lower pressure chambers 82, 86 of the cylinders 50, 68. The areas of these chambers are equal in the two cylinders and result in equal forces being applied to the suspension arms 22 and 20.

In forward acceleration, the hydraulic fluid in the upper chambers 80, 84 is compressed. The upper chambers 80 and 84 have unequal cross sectional areas of fluid under pressure due to the difference in diameters of the two piston rods 60 and 64. The cylinder 68 on the right side of the vehicle, having the smaller rod 74, has a greater fluid area and thus exerts a force on the right side suspension arm 20 greater than the force exerted by the left side cylinder 50. The difference in forces applied to the torque arms 20, 22 by the cylinders results in a corresponding difference in vertical rections to the body at the front ends of the arms 20 and 22. The right side arm 20 lifts more than the arm 22 and results in a counterclockwise moment (viewed from the rear) to the body which can be designed to be exactly equal and opposite to the clockwise torque transmitted to the body through the engine mounts.

The sum of all vertical forces applied to each arm are equal, therefore, the vertical downward force at the axle attachments of the right arm is greater than that of the left arm 22. This unequal loading of the rear axle housing 10 by the suspension arms 20, 22 can provide a torque equal and opposite to the torque transmitted to the axle by the propeller shaft 106 resulting in equal load on the rear tires 12 and 14 during forward acceleration in a straight line.

The interconnection between the upper chambers 80 and 84 and the separate interconnection between the lower chambers 82 and 86 permits body roll and individual vertical wheel movement without appreciable resistance. The expansible hose provides a reservoir for the slight change in the capacity resulting from operation of two cylinders with piston rods of different diameters.

The foregoing description presents the presently preferred embodiment of this invention. Modifications and alteration may occur to those skilled in the art that will come within the scope and spirit of the invention.

I claim:

1. A suspension system for a motor vehicle comprising a wheel, a wheel support member rotatably supporting said wheel, vehicle support structure, and suspension means interconnecting said wheel support member and said support structure, said suspension means comprising a suspenion arm having one of its ends pivotally connected to said support structure, connecting means connecting the other of the ends of said arm to said wheel support member, hydraulic pressure means interposed between said wheel support member and said arm and constructed to convey torque reaction from said wheel support member to said arm during vehicle acceleration.

2. A suspension system according to claim 1 and including:
said suspension arm having its forward end connected to said support structure and its rear end to said wheel support member.

3. A suspension system according to claim 1 and including:
said connecting means comprising a pivot interposed between said wheel support member and said one end of said suspension arm, said pivot means being spaced on one side of the axis of rotation of said wheel, said hydraulic pressure means being disposed on the other side of the axis of rotation of said wheel.

4. A suspension system according to claim 1 and including:
said suspension arm having its forward end connected to said support structure and its rear end to said wheel support member, said connecting means comprising a pivot interposed between said wheel support member and the rear end of said suspension arm, said pivot means being spaced on one side of the aixs of rotation of said wheel, said hydraulic pressure means comprising a double acting hydraulic cylinder assembly connected to said wheel support member and said suspension arm, said cylinder assembly being disposed on the other side of the axis of rotation of said wheel.

5. A rear suspension system for a motor vehicle comprising a rigid axle housing, a pair of road wheels rotatably mounted at the outer ends of said axle housing, vehicle support structure and suspension means interconnecting said axle housing and said support structure, said means comprising left and right suspension arms, said suspension arms having one of their ends pivotally connected to said support structure, connecting means connecting said arms to said axle housing and constructed to permit the transmission of torque from said axle housing to said arms during vehicle acceleration while permitting angular deflection of said arms in opposite directions relative to said axle housing during body roll, said connecting means including left and right hydraulic pressure fluid means interposed between said suspension arms and said axle housing, said hydraulic fluid means being constructed to convey torque reaction from said axle housing to said suspension arms during vehicle acceleration.

6. A rear suspension system according to claim 5 and including:
fluid communication means interconnecting said hydraulic fluid means.

7. A rear suspension system according to claim 5 and including:
said fluid means comprising left and right double acting hydraulic cylinder assemblies interposed between said axle housing and said suspension arms, said left and right cylinder assemblies having piston portions connected to said axle housing, said left and right cylinder assemblies having body portions connected to said left and right suspension arms respectively, said left and right cylinder assemblies each having an internal pressure chamber defined in part by said piston portion, communication means interconnecting said pressure chambers of said left and right cylinder assemblies, said pressure chambers have an unequal cross sectional area, said combination providing a structure to offset engine torque reaction during vehicle acceleration and thereby provide equal traction between the vehicle driving wheels.

8. A rear suspension system according to claim 7 and including:
said communication means comprising a member expansible under fluid pressure.

9. A rear suspension system according to claim 5 and including:
said fluid means comprising left and right double acting hydraulic cylinder assemblies interposed between said axle housing and said suspension arms, said left and right cylinder assemblies having piston rod portions connected to said axle housing, said left and right cylinder assemblies having body portions connected to said left and right suspension arms respectively, said left and right cylinder assemblies each having a reciprocable piston connected to said piston rod and dividing said cylinder assembly into internal upper and lower pressure chambers, first communication means interconnecting said lower pressure chambers of said left and right cylinder assemblies, second communication means interconnecting said upper pressure chambers of said left and right cylinder assemblies, the piston rod for one of said cylinder assemblies having a greater diameter than the piston rod for the other of said cylinder assemblies whereby said two upper pressure chambers have an unequal cross sectional area, said combination providing a structure to offset engine torque reaction during vehicle acceleration and thereby provide equal traction between the vehicle driving wheels.

10. A rear suspension system according to claim 5 and including:
said suspension arms having their forward ends connected to said support structure and their near ends connected to said axle housing, left and right pivot brackets extending rearwardly from said axle housing, pivot means interconnecting said brackets and the rear ends of said suspension arms, said fluid means comprising left and right double acting hydraulic cylinder assemblies interposed between said axle housing and said suspension arms, left and right support brackets extending forwardly from said axle housing, said left and right cylinder assemblies having piston rod portions connected to said left and right support brackets respectively, said left and right cylinder assemblies having body portions connected to said left and right suspension arms respectively, said left and right cylinder assemblies each having a reciprocable piston connected to said piston rod and dividing said cylinder assembly into internal upper and lower pressure chambers, first communication means interconnecting said lower pressure chambers of said left and right cylinder assemblies, second communication means interconnecting said upper pressure chambers of said left and right cylinder assemblies, the piston rod for one of said cylinder assemblies having a greater diameter than the piston rod for the other of said cylinder assemblies whereby said two upper pressure chambers have an unequal cross sectional area, one of said communication means comprising a member expansible under fluid pressure, said combination providing a structure to offset engine torque reaction during vehicle acceleration and thereby provide equal traction between the vehicle driving wheels.

References Cited

UNITED STATES PATENTS

| | | | |
|---|---|---|---|
| 2,367,817 | 1/1945 | Brown | 180—73 |
| 3,171,642 | 3/1965 | Allison | 280—124 X |
| 3,181,877 | 5/1965 | McHenry | 267—64 X |

A. HARRY LEVY, Primary Examiner

U.S. Cl. X.R.
267—64; 280—124